April 7, 1959 W. A. RAY 2,881,274
GAS DETECTOR AND SYSTEM FOR GAS DETECTION
Filed June 24, 1957
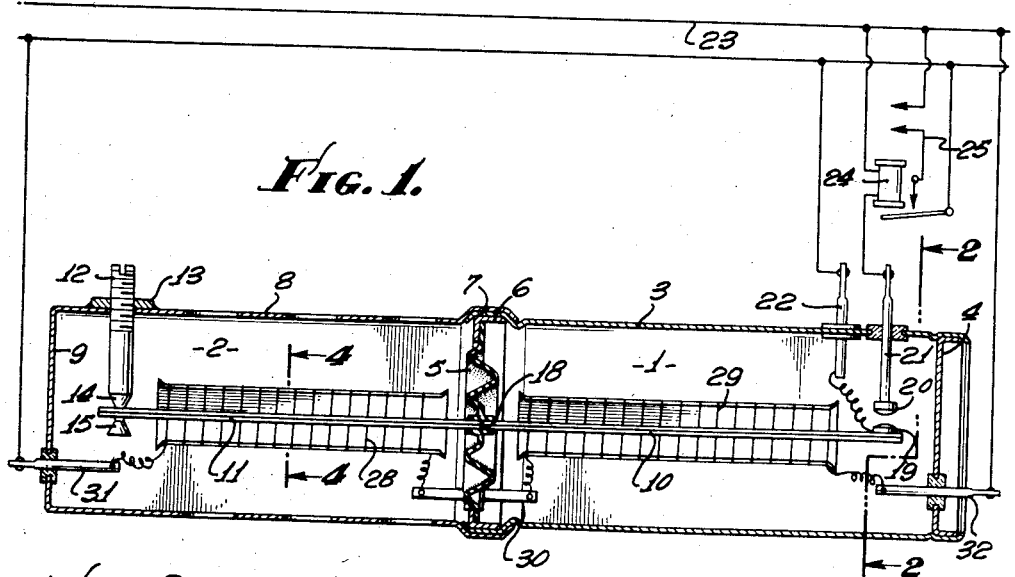
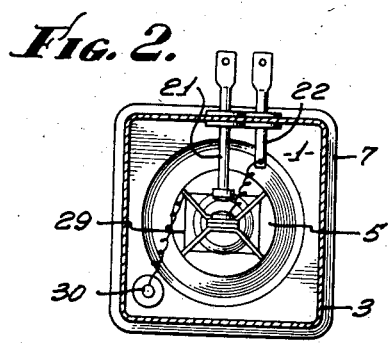
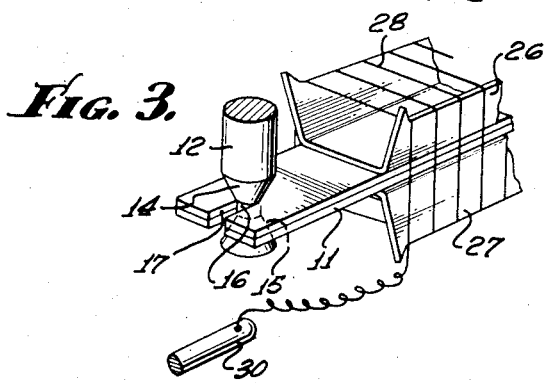
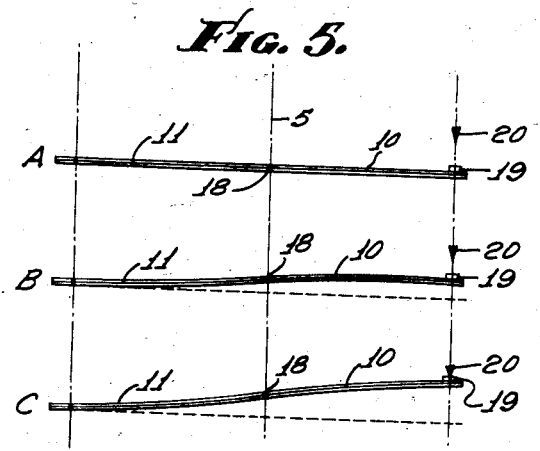
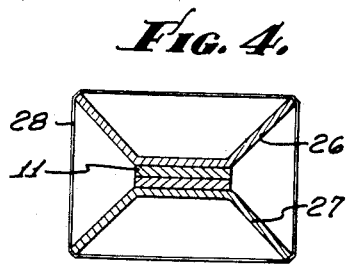
INVENTOR.
WILLIAM A. RAY
BY
ATTORNEYS.

United States Patent Office 2,881,274
Patented Apr. 7, 1959

2,881,274

GAS DETECTOR AND SYSTEM FOR GAS DETECTION

William A. Ray, North Hollywood, Calif., assignor to General Controls Co., a corporation of California Application June 24, 1957, Serial No. 667,450

10 Claims. (Cl. 200—61.03)

This invention relates to an apparatus and a system for detecting the presence of contaminating gases in the atmosphere.

Fuel gases as at present used, are odorless and colorless; accordingly, their presence in lethal concentration may be unnoticed, and resultant asphyxiation or explosions would occur.

It is one of the objects of this invention to make it possible to detect such dangerous conditions, long before lethal concentrations exist.

It is another object of this invention to provide an alarm or control system of this character, that is simple and inexpensive to produce.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a view manily in longitudinal section of an apparatus incorporating the invention, the electrical system in which the apparatus is used also being diagrammatically illustrated;

Fig. 2 is a sectional view, taken along a plane corresponding to line 2—2 of Fig. 1;

Fig. 3 is an enlarged fragmentary pictorial view of one end of a portion of the apparatus;

Fig. 4 is an enlarged sectional view, taken along a plane corresponding to line 4—4 of Fig. 1; and Fig. 5 is a diagram illustrating the operation of the mechanism.

The apparatus comprises a hermetically sealed space 1 and a space 2 which is open to the atmosphere. The arrangement is such that when space 2 is subjected to circumambient atmosphere which includes a hydrocarbon fuel gas due to gas leakage, then an alarm or a control system is operated.

The space 1 is defined by a hollow housing 3 having a right-hand cover member 4 and a flexible wall 5 at its left-hand end. This flexible wall 5 is in the form of a circular, corrugated, thin rubber diaphragm attached at its outer periphery to a flanged ring 6. This flanged ring is in hermetic sealing relation with the flange 7 integral with the housing 3.

The space 2 is defined by a vented hollow housing 8. Its right-hand cover is formed by the diaphragm 5, and its left-hand cover 9 is shown as integral with the walls of the housing 8.

The spaces 1 and 2 carry respectively bimetal elements 10 and 11 joined together in tandem relation, as by welding, and extending through the diaphragm 5 at the joint 18. The diaphragm 5 permits flexure of the bimetal tandem structure. Furthermore, the two layers of dissimilar metal of each of the bimetal members 10 and 11 are reversely arranged with respect to the dissimilar metals of the other member.

At the left-hand end, an appropriate anchoring means is provided for supporting the tandem structure. For this purpose, use is made of an adjustable headless screw 12 threaded in a boss 13 supported on the exterior of the housing 8. The lower end of this screw 12, as shown most clearly in Fig. 3, has opposed conical surfaces 14 and 15 forming a neck between them. This neck 16 is adapted to fit snugly within a slot 17 in the left-hand end of the bimetal member 11.

The bimetal members 10 and 11 are purposely made so that they have the same characteristics. Accordingly, if they are subjected to identical temperatures, one bimetal member will compensate for the other and the upper right-hand end remains substantially stationary. This effect is indicated in Fig. 5. In position A, both members 10 and 11 are unheated. Accordingly, both the right and left-hand ends of the tandem structure follow a common horizontal line. In position B, both members 10 and 11 are heated equally. It will be noted that the right-hand end stays in substantially the same position as in position A. However, if member 11 is heated more than member 10, then the right-hand end of the tandem structure is shifted upwardly and can perform a switching or control operation.

In the diagram, Fig. 5, reference character 5 denotes the flexible diaphragm which permits the joint 18 between the members 10 and 11 to move quite freely as required by the relative heating of the members 10 and 11.

In the present instance, unequal heating of the bimetal members 10 and 11 causes a circuit to be controlled. For this purpose, a contact member 19 is mounted on the right-hand end of the tandem structure. This contact member is arranged to cooperate with a stationary contact member 20 having a supporting conductor post 21 insulatingly supported by the upper wall of housing 3. A connection to the movable contact member 19 is effected by the aid of a similar insulatingly supported conductor post 22.

When the bimetal member 11 is heated to a higher temperature than bimetal member 10, the movable contact member 19 engages the contact member 20. A circuit is then completed from mains 23 through a relay coil 24. The mains 23 may be connected to a source of low potential, such as twenty-four volts, usually employed for control systems.

The relay 24 in turn controls a circuit 25 for energizing either an alarm or a control element.

Provisions are made for unequal heating of the bimetal members 10 and 11 in response to exposure of the bimetal member 11 to hydrocarbon gaseous atmosphere. This is accomplished by virtue of the well-known phenomenon in which catalytic action of heated platinum in contact with such gaseous atmosphere produces a heating effect upon the platinum.

Thus, each of the bimetal members 10 and 11 carries an electrical heating element formed by exposed platinum wire. The heating element associated with the bimetal member 11 is supported upon a frame formed of upper and lower frame elements 26 and 27 mounted upon or carried by the bimetal element 11 (see Fig. 3). The frame elements are made of insulation and provide a support for the exposed platinum wire coil 28. In this way, the coil 28 encompasses the bimetal member 11, and serves as an electrical heating element for the bimetal member 11.

A similar exposed platinum wire heating element or coil 29 surrounds and is appropriately supported by the right-hand bimetal member 10. These elements 28 and 29 have identical heating effect, so that when both are energized equally, the bimetal members 10 and 11 flex equally and in opposite directions so as to produce the effect of position B of Fig. 5. For this purpose, the coils 28 and 29 are connected in series as by the aid of the conducting bar 30 extending through the diaphragm 5. End terminals 31 and 32 serve to connect the elements 28 and 29 in series, to the mains 23.

However, when the circumambient atmosphere entering the vented housing 8 carries hydrocarbon gas, the catalytic action causes the platinum wire element 28 to be heated. The bimetal member 11 is therefore flexed to a greater extent in an upward direction than the bimetal member 10 which is isolated from the circumambient atmosphere. Accordingly, a circuit is completed between contacts 19 and 20.

This in turn causes a signal or alarm to sound, as hereinbefore explained.

The inventor claims:

1. In apparatus of the character described: a pair of bimetal members joined in tandem, one end of the tandem structure being fixed; and each member having dissimilar bimetal elements reversed in position with respect to the other member; and means for heating each of said members; the heating means for only one member being influenced by the presence of hydrocarbon gas in the circumambient atmosphere for increasing the heating effect of the heating means for said one member, whereby the members are deflected.

2. In apparatus of the character described: a pair of bimetal members joined in tandem, one end of the tandem structure being fixed; and each member having dissimilar bimetal elements reversed in position with respect to the other member; means for heating each of said members; the heating means for only one member being influenced by the presence of hydrocarbon gas in the circumambient atmosphere for increasing the heating effect of the heating means for said one member, whereby the members are deflected; and a circuit controller operated by the other end of the tandem structure.

3. In apparatus of the character described: a pair of bimetal members joined in tandem, one end of the tandem structure being fixed; and each member having dissimilar bimetal elements reversed in position with respect to the other member; electrical heating elements respectively for the members, each heating element being formed of exposed platinum conductors; and means enclosing one of the members and its heating means, the heater for the other member being subjected to the circumambient atmosphere so that hydrocarbon gas in the atmosphere may influence the heating effect on said other element.

4. In apparatus of the character described: a pair of bimetal members joined in tandem, one end of the tandem structure being fixed; and each member having dissimilar bimetal elements reversed in position with respect to the other member; electrical heating elements respectively for the members, each heating element being formed of exposed platinum conductors; means enclosing one of the members and its heating means, the heater for the other member being subjected to the circumambient atmosphere so that hydrocarbon gas in the atmosphere may influence the heating effect on said other element; and a circuit controller operated by the other end of the tandem structure.

5. In apparatus of the character described: a pair of bimetal members; electrical heating means including exposed platinum conductors respectively associated with the members, a circuit controller responsive to a differential in the temperatures of the two members; means substantially entirely enclosing one member and its heating means; and means forming an enclosure with vents for the other member and its heating means.

6. In apparatus of the character described: a pair of substantially identical bimetal members joined end to end, each member having dissimilar bimetal elements, reversed in position with respect to the other member; said joined members forming a tandem structure; means anchoring one of the ends of the tandem structure; a flexible wall interposed between the two members; means cooperating with said wall to form a completely closed housing for one member, and a vented housing for the other member; exposed platinum heating elements for each of the members and supported thereby within the respective housings; means supplying electrical energy of substantially equal amounts to said heating elements; and a circuit controller operated by the free end of the tandem structure.

7. In apparatus of the character described: a pair of substantially identical bimetal members joined end to end, each member having dissimilar bimetal elements, reversed in position with respect to the other member; said joined members forming a tandem structure; means anchoring one of the ends of the tandem structure; a flexible wall interposed between the two members; means cooperating with said wall to form a completely closed housing for one member, and a vented housing for the other member; exposed platinum heating elements for each of the members and supported thereby within the respective housings; insulation frames respectively mounted on the members for supporting said elements; said elements being connected in series and capable of electrically heating both members substantially equally; and a circuit controller operated by the free end of the tandem structure.

8. In apparatus of the character described: a pair of substantially identical bimetal members joined end to end, each member having dissimilar bimetal elements, reversed in position with respect to the other member; said joined members forming a tandem structure; means anchoring one of the ends of the tandem structure; a flexible wall interposed between the two members; means cooperating with said wall to form a completely closed housing for one member, and a vented housing for the other member; exposed platinum heating elements for each of the members and supported thereby within the respective housings; insulation frames respectively mounted on the members for supporting said elements; said elements being connected in series and capable of electrically heating both members substantially equally; that member enclosed in the vented housing and its associated heating element, when subjected to an atmosphere including hydrocarbon gases, being thereby heated to a greater degree than the other member, whereby a deflection of the free end of the tandem structure occurs; and a circuit controller operated by the free end of the tandem structure.

9. In apparatus of the character described: a pair of hollow housing members each open at one end; a flexible wall; means joining the housing members so that the flexible wall is confined between the open ends of the housing members, the flexible wall entirely sealing one of said housing members; the other of said housing members having vent openings for communication between the interior of said other housing member and the ambient atmosphere; a pair of substantially identical bimetal members joined end to end at the flexible wall, and extending respectively in the housing members; each member having dissimilar bimetal strips reversed in lateral position with respect to those of the other bimetal member; said joined bimetal members forming a tandem structure; means anchoring one of the ends of the tandem structure; insulation frames respectively mounted on the bimetal members; exposed platinum heating elements on each of the frames; said elements being connected in series and capable of electrically heating both members substantially equally; that bimetal member enclosed in said other of said housing members, and its associated heating element, when subjected to an atmosphere including hydrocarbon gases, being thereby heated to a greater degree than the other bimetal member, whereby deflection of the free end of the tandem structure occurs; and a circuit controller operated by the free end of the tandem structure.

10. In apparatus of the character described: a pair of hollow housing members each open at one end; a flexible walls; means joining the housing members so that the flexible wall is confined between the open ends of the housing members, the flexible wall entirely sealing one of said housing members; the other of said housing members having vent openings for communication between the interior of said other housing member and the ambient atmosphere; a pair of substantially identical bimetal members joined end to end at the flexible wall, and extending respectively in the housing members; each member having dissimilar bimetal strips reversed in lateral position with respect to those of the other bimetal member; said joined bimetal members forming a tandem structure; a screw adjustably mounted on said other housing member and accessible exteriorly, said screw having opposed conical surfaces forming a neck; the strips of the corresponding bimetal member having slots snugly fitting the neck whereby the tandem structure is anchored at one end; insulation frame elements secured to the strips of each bimetal member to form frames respectively for the bimetal members; an exposed platinum heating element for each frame and coiled thereabout to extend in spaced exterior encompassing relationship to the corresponding bimetal member; said elements being connected in series and capable of electrically heating both members substantially equally; that bimetal member enclosed in said other of said housing members, and its associated heating element, when subjected to an atmosphere including hydrocarbon gases, being thereby heated to a greater degree than the other bimetal member, whereby deflection of the free end of the tandem structure occurs; and a contact member affixed to and extending into said one housing member, and engaged by the free end of said trandem structure upon predetermined deflection thereof.

References Cited in the file of this patent

UNITED STATES PATENTS

| | | |
|---|---|---|
| 899,068 | Philip et al. | Sept. 22, 1908 |
| 2,178,486 | Menozzi | Oct. 31, 1939 |
| 2,178,487 | Menozzi | Oct. 31, 1939 |
| 2,666,105 | Menozzi et al. | Jan. 12, 1954 |